United States Patent
Chron et al.

(10) Patent No.: US 8,914,330 B2
(45) Date of Patent: Dec. 16, 2014

(54) BULK DELETION THROUGH SEGMENTED FILES

(75) Inventors: Edward Gustav Chron, Sunnyvale, CA (US); Frederick Douglis, Basking Ridge, NJ (US); Stephen Paul Morgan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 11/156,842

(22) Filed: Jun. 20, 2005

(65) Prior Publication Data
US 2006/0288047 A1  Dec. 21, 2006
US 2012/0047188 A9  Feb. 23, 2012

Related U.S. Application Data

(63) Continuation-in-part of application No. 10/943,397, filed on Sep. 17, 2004, now abandoned, and a continuation-in-part of application No. 10/944,597, filed on Sep. 17, 2004, now Pat. No. 7,958,093.

(51) Int. Cl.
*G06F 7/00* (2006.01)
*G06F 17/30* (2006.01)

(52) U.S. Cl.
CPC ............... *G06F 17/30117* (2013.01)
USPC .......... 707/661; 707/662; 707/770; 369/47.1; 711/100; 711/203

(58) Field of Classification Search
None
See application file for complete search history.

(56) References Cited

U.S. PATENT DOCUMENTS

| | | | |
|---|---|---|---|
| 5,513,336 A | 4/1996 | Vishlitzky et al. | |
| 5,522,067 A * | 5/1996 | Swire | 382/128 |
| 5,696,926 A * | 12/1997 | Culbert et al. | 711/203 |
| 6,073,142 A * | 6/2000 | Geiger et al. | 715/205 |
| 6,446,188 B1 | 9/2002 | Henderson et al. | |
| 6,519,652 B1 * | 2/2003 | Sadiq | 719/316 |
| 6,615,318 B2 | 9/2003 | Jarvis et al. | |
| 6,671,766 B1 | 12/2003 | Vandenbergh et al. | |
| 6,678,793 B1 | 1/2004 | Doyle | |
| 6,732,237 B1 | 5/2004 | Jacobs et al. | |
| 6,757,708 B1 * | 6/2004 | Craig et al. | 709/203 |

(Continued)

OTHER PUBLICATIONS

"Position: Short Object Lifetimes Require a Delete-Optimized Storage System," by Douglis et al., 11th ACM SIGOPS European Workshop, Sep. 2004.*

(Continued)

*Primary Examiner* — Fred I Ehichioya
*Assistant Examiner* — Hasanul Mobin
(74) *Attorney, Agent, or Firm* — Yee & Associates, P.C.; Jeff Tang

(57) ABSTRACT

A mechanism is provided that aggregates data in a way that permits data to be deleted efficiently, while minimizing the overhead necessary to support bulk deletion of data. A request is received for automatic deletion of segments in a container and a waterline is determined for the container. A determination is made if at least one segment in the container falls below the waterline. Finally, in response to one segment falling below the waterline, the segment from the container is deleted. Each object has an associated creation time, initial retention value, and retention decay curve (also known as a retention curve). At any point, based on these values and the current time, the object's current retention value may be computed. The container system continually maintains a time-varying waterline: at any point, objects with a retention value below the waterline may be deleted.

21 Claims, 8 Drawing Sheets

(56) References Cited

U.S. PATENT DOCUMENTS

| | | | |
|---|---|---|---|
| 6,983,318 B2 | 1/2006 | Doyle | |
| 7,020,658 B1 | 3/2006 | Hill | |
| 7,281,087 B2 | 10/2007 | Kuwata | |
| 7,343,459 B2* | 3/2008 | Prahlad et al. | 711/162 |
| 7,478,218 B2 | 1/2009 | Bruening et al. | |
| 7,590,807 B2 | 9/2009 | McGovern et al. | |
| 7,958,093 B2 | 6/2011 | Anderson et al. | |
| 8,099,394 B2 | 1/2012 | Malcolm | |
| 2002/0078077 A1* | 6/2002 | Baumann et al. | 707/206 |
| 2002/0083006 A1 | 6/2002 | Headings et al. | |
| 2004/0078518 A1 | 4/2004 | Kuwata | |
| 2004/0088376 A1* | 5/2004 | McCanne et al. | 709/219 |
| 2005/0036520 A1* | 2/2005 | Zeng et al. | 370/503 |
| 2005/0097260 A1* | 5/2005 | McGovern et al. | 711/100 |
| 2006/0072400 A1* | 4/2006 | Anderson et al. | 369/47.1 |
| 2006/0075007 A1 | 4/2006 | Anderson et al. | |
| 2006/0106852 A1 | 5/2006 | Siddall et al. | |
| 2006/0190924 A1 | 8/2006 | Bruening et al. | |
| 2006/0200700 A1* | 9/2006 | Malcolm | 714/38 |

OTHER PUBLICATIONS

"Microsoft Office Outlook 2003 Step by Step", Publisher: Microsoft, Date: Sep. 24, 2003.*

"Microsoft® Office Outlook® 2003 Inside Out", by: Jim Boyce, Publisher: Microsoft Press, Date: Nov. 12, 2003.*

Douglis et al., "Position: Short Object Lifetimes Require a Delete-Optimized Storage System", 11$^{th}$ ACM SIGOPS European Workshop, Sep. 2004, 6 pages.

Anderson et al., System and Method for Optimizing a Storage System to Support Short Data Lifetimes, Sep. 17, 2004.

Anderson et al., System and Method for Optimizing a Storage System to Support Full Utilization of Storage Space, Sep. 17, 2004.

"A Tutorial on Disk Defragmentation for Windows NT/2000/XP and Windows Server 2003—What You Don't Know Can Hurt You," Raxco Software, May 2003, 21 pages.

"How to Set AutoArchive," Microsoft Outlook—Riding the Wave of Technology, exchange.sandi.net/info/pdf/How%20to20set%AutoArchive%20.pdf, Sep. 9, 2003, 7 pages.

Blackwell et al., "Heuristic Cleaning Algorithms in Log-Structured File Systems," In: Proceedings of the Winter 1995 USENIX Technical Conference, New Orleans, Louisiana, Jan. 1995, 12 pages.

Chandrasekaran et al., "TelegraphCQ: Continuous Dataflow Processing for an Uncertain World," In: Proceedings of the First Biennial Conference on Innovative Data Systems Research (CIDR), Asilomar, California, Jan. 2003, 12 pages.

Gartner et al., "Efficient Bulk Deletes in Relational Databases," In: Proceedings of the 17th International Conference on Data Engineering, Heidelberg, Germany, Apr. 2001, 10 pages.

Gavish et al., "Dynamic File Migration in Distributed Computer Systems," Communications of the ACM, 33 (2):177-189, Feb. 1990.

Iyer et al., "Anticipatory Scheduling: A Disk scheduling Framework to Overcome Deceptive Idleness in Synchronous I/O," 18th ACM Symposium on Operating Systems Principles (SOSP 2001), 35(5):117-130, Dec. 2001.

Leonard et al., "The Design and Implementation of Elastic Quotas: A System for Flexible File System Management," http://www.fsl.cs.sunysb.edu/docs/equota-design/index.html, Jul. 6, 2005, 2 pages.

McKusick et al., "A Fast File System for UNIX*," ACM Transactions on Computer Systems, 2(3)L181-197, Aug. 1984, 43 pages.

Menon et al., "An Age-Threshold Algorithm for Garbage Collection in Log-Structured Arrays and File Systems," International Business Machines Corporation, IBM Research Report RJ 10120, 1983.

Ousterhout et al., "Beating the I/O Bottleneck: A Case for Log-Structured File Systems," ACM Operating Systems Review, 23(1):11-28, Jan. 1989.

Patterson et al., "Informed Prefetching and Caching," In: Proceedings of the 15th ACM Symposium on Operating System Principles, Copper Mountain Resort, Colorado, Dec. 3-6, 1995, pp. 79-95.

Rosenblum et al., "The Design and Implementation of a Log-Structured File System," ACM Transactions on Computer systems, 10(1):26-52, Feb. 1992.

Santry et al., "Deciding when to Forget in the Elephant File System," Operating Systems Review, 34(5):110-123, Dec. 1999.

Seltzer et al., "An Implementation of a Log-Structured File System for UNIX," In: Proceedings of the Winter 1993 USENIX Technical Conference, San Diego, California, Jan. 1993, 18 pages.

Wang et al., "Wolf—A Novel Reordering Write Buffer to Boost the Performance of Log-Structured File Systems," In: Proceedings of the First USENIX Conference on File and Storage Technologies, Monterey, California, Jan. 28-30, 2002, 14 pages.

Wilkes et al., "The HP AutoRAID Hierarchical Storage System," ACM Transactions on Computer Systems, 14(1):108-136, Feb. 1996.

Zadok et al., "Reducing Storage Management Costs via Informed User-Based Policies," http://www.fsl.cs.sunysb.edu/docs/equota-msst/index.html, Jul. 6, 2005, 9 pages.

Zadok et al., "Reducing Storage Management Costs via Informed User-Based Policies," http://www.fsl.cs.sunysb.edu/docs/equota-policy/index.html, Jul. 6, 2005, 20 pages.

Zdonik et al., "The Aurora and Medusa Projects," Bulletin of the IEEE Computer Society Technical Committee on Data Engineering, 26(1):3-10, 2003.

Office Action, dated Oct. 20, 2006, regarding U.S. Appl. No. 10/943,397, 13 pages.

Final Office Action, dated Mar. 23, 2007, regarding U.S. Appl. No. 10/943,397, 14 pages.

Appeal Brief, dated Jun. 18, 2007, regarding U.S. Appl. No. 10/943,397, 31 pages.

Examiner's Answer, dated Sep. 17, 2007, regarding U.S. Appl. No. 10/943,397, 15 pages.

Reply Brief, dated Nov. 16, 2007, regarding U.S. Appl. No. 10/943,397, 8 pages.

Decision on Appeal, dated Sep. 21, 2009, regarding U.S. Appl. No. 10/943,397, 11 pages.

Office Action, dated Oct. 19, 2006, regarding U.S. Appl. No. 10/944,597, 14 pages.

Final Office Action, dated Apr. 19, 2007, regarding U.S. Appl. No. 10/944,597, 18 pages.

Final Office Action, dated Jun. 22, 2009, regarding U.S. Appl. No. 10/944,597, 18 pages.

Office Action, dated Dec. 22, 2009, regarding U.S. Appl. No. 10/944,597, 21 pages.

Final Office Action, dated Jul. 8, 2010, regarding U.S. Appl. No. 10/944,597, 54 pages.

Notice of Allowance, dated Jan. 11, 2011, regarding U.S. Appl. No. 10/944,597, 7 pages.

* cited by examiner

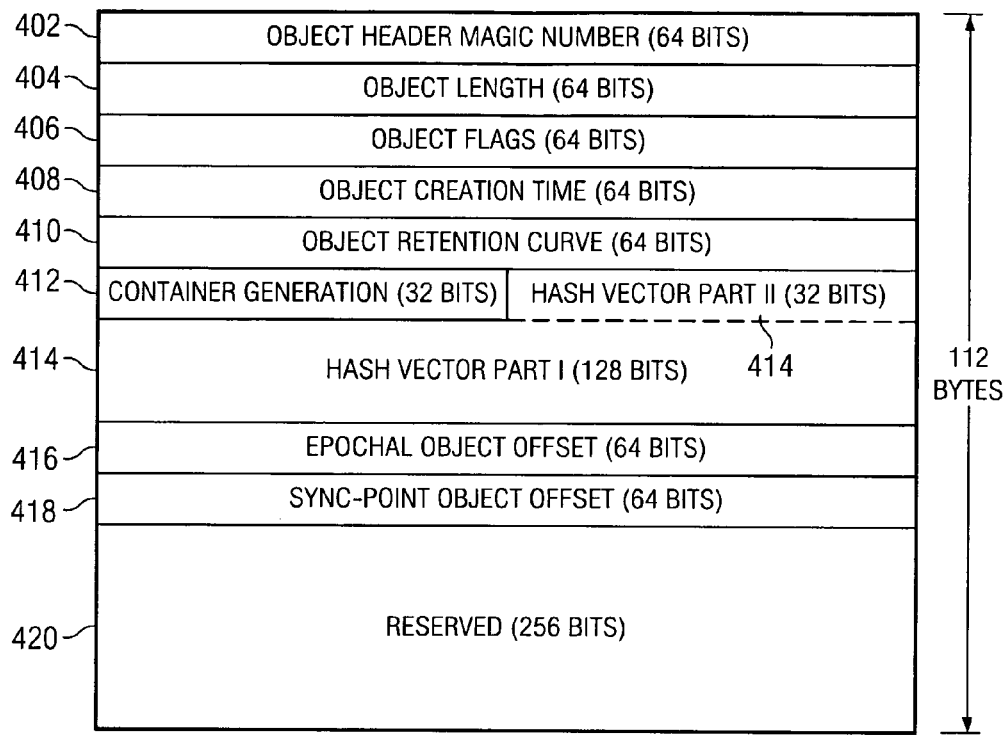
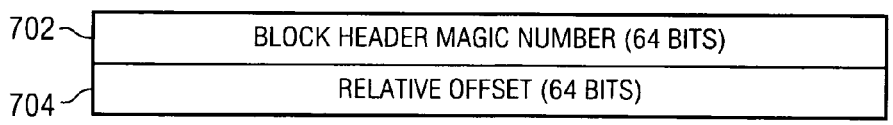
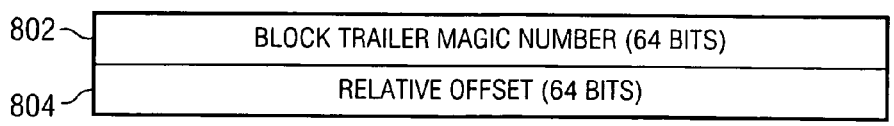

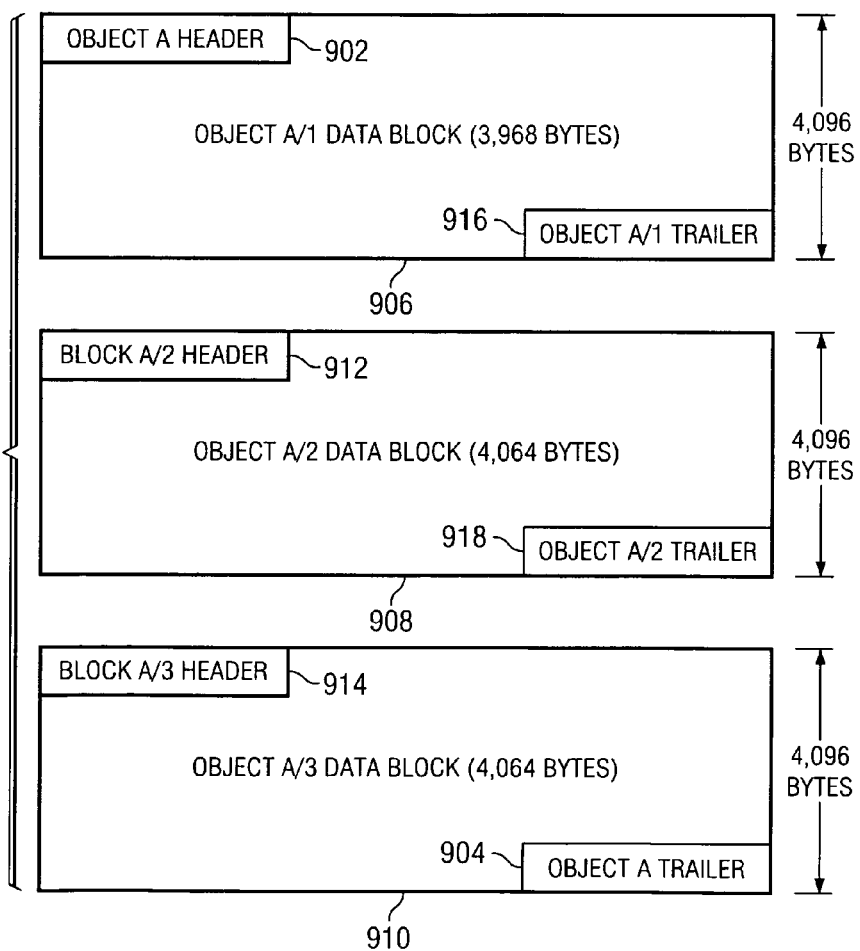

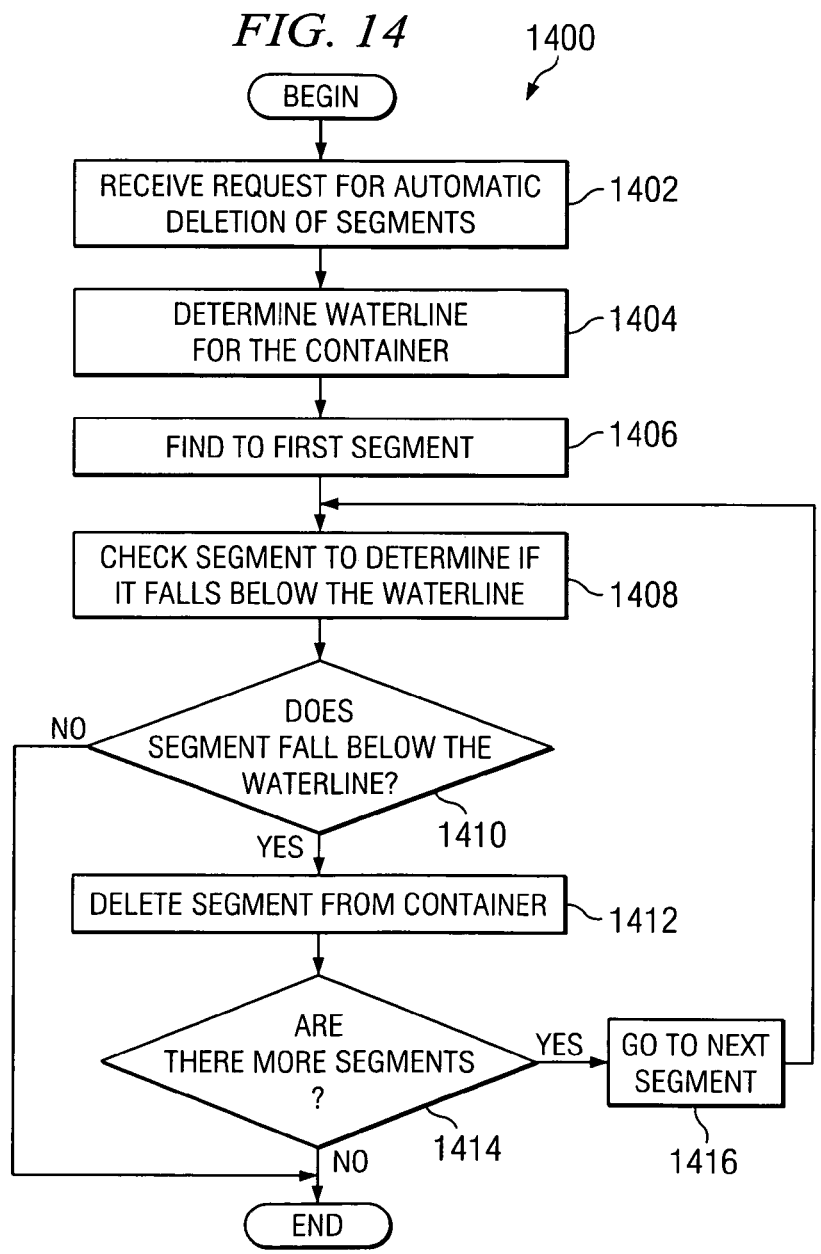

BULK DELETION THROUGH SEGMENTED FILES

CROSS-REFERENCE TO RELATED APPLICATIONS

This application is a continuation-in-part application of both of the following applications: U.S. patent application Ser. No. 10/943,397, filed on Sep. 17, 2004, now abandoned entitled "System and Method for Optimizing a Storage System to Support Full Utilization of Storage Space"; and U.S. patent application Ser. No. 10/944,597, filed on Sep. 17, 2004, now U.S. Pat. No. 7,958,093 entitled "System and Method for Optimizing a Storage System to Support Short Data Lifetimes". All of the above related applications are assigned to the same assignee, and incorporated herein by reference.

GOVERNMENT RIGHTS

This invention was made under Government support under Contract No. H98230-04-3-0001 awarded by the U.S. Department of Defense. The Government has certain rights in this invention.

BACKGROUND OF THE INVENTION

1. Field of the Invention

The present invention relates generally to an improved data processing system. More particularly, the present invention provides a mechanism for aggregating data in a way that permits data to be deleted efficiently, while minimizing the overhead necessary to support bulk deletion of data.

2. Description of the Related Art

Early file systems were designed with the expectation that data would typically be read from disk many times before being deleted. Therefore, on-disk data structures were optimized for reading of data. However, as main memory sizes increased, more read requests could be satisfied from data cached in memory. This motivated file system designs that optimized write performance rather than read performance. However, the performance of such system tends to suffer from overhead due to the need to garbage collect current, i.e. "live," data while making room for areas where new data can be written.

New types of systems are evolving in which, in addition to reading and writing of data, creation and deletion of data are important factors in the performance of the system. These systems tend to be systems in which data is quickly created, used and discarded. These systems also tend to be systems in which the available storage system resources are generally fully utilized. In such systems, the creation of data and deletion of this data is an important factor in the overall performance of the system.

However, known file systems, which are optimized for data reads or, alternatively, data writes, do not provide an adequate performance optimization for this new breed of systems. Previous file systems teach a method whereby a sequence of objects is stored in a set of storage segments. See "Position: Short Object Lifetimes Require a Delete-Optimized Storage System," by Douglis et al., 11th ACM SIGOPS European Workshop, September 2004, which is hereby incorporated by reference. Typically, such segments are fixed in size and pre-allocated. At any given time, a plurality of segments are available for storing newly written objects, with each segment holding objects with similar retention attributes, specifically a retention value and retention decay function. When an object is to be stored, a then-in-use segment is the first target of the store operation. Although the segment may be empty, typically, the segment already holds a plurality of other objects. Therefore, it would be advantageous to have a system and method for a mechanism that aggregates data in a way that permits data to be deleted efficiently, while minimizing the overhead necessary to support bulk deletion of data.

SUMMARY OF THE INVENTION

The present invention provides for a mechanism that aggregates data in a way that permits data to be deleted efficiently, while minimizing the overhead necessary to support bulk deletion of data. In the present invention, a request for automatic deletion of segments in a container is received and a waterline for the container is determined. A determination is made if at least one segment in the container falls below the waterline. Finally, in response to one segment falling below the waterline, the segment from the container is deleted. Each object has an associated creation time, initial retention value, and retention decay curve (also known as a retention curve). At any point, based on these values and the current time, the object's current retention value may be computed. The container system continually maintains a time-varying waterline: at any point, objects with a retention value below the waterline may be deleted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts an object header layout in accordance with an illustrative embodiment of the present invention;

FIG. 7 depicts a block header in accordance with an illustrative embodiment of the present invention;

FIG. 8 depicts a block trailer in accordance with an illustrative embodiment of the present invention;

FIG. 9 depicts an exemplary multi-block object layout in accordance with an illustrative embodiment of the present invention;

FIG. 14 depicts a flow diagram illustrating an exemplary operation of aggregating data in a way that permits data to be deleted efficiently in bulk in accordance with an illustrative embodiment of the present invention.

DETAILED DESCRIPTION OF THE PREFERRED EMBODIMENT

Figure 1:
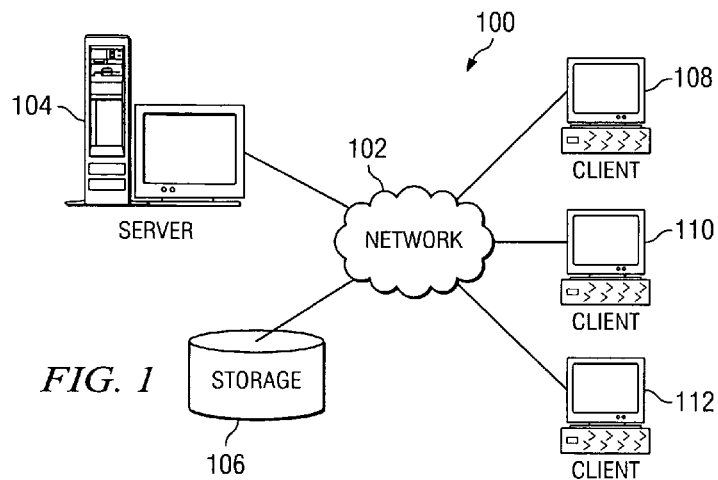
FIG. 1 is an exemplary diagram of a distributed data processing system in which aspects of the present invention may be implemented.
Figure 2:
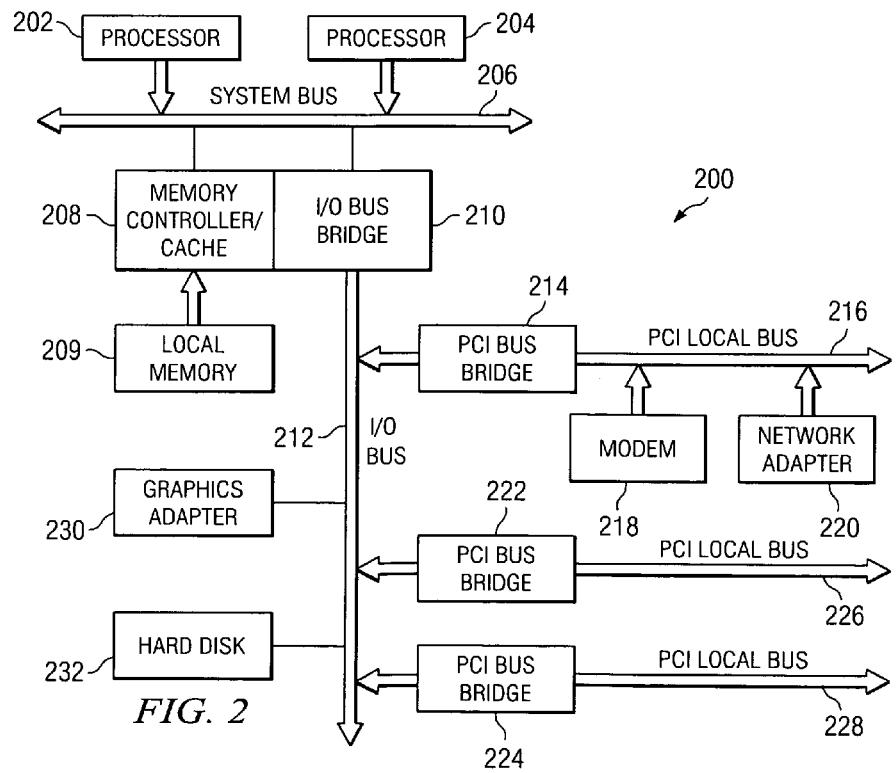
FIG. 2 is an exemplary block diagram of a server computing device in which aspects of the present invention may be implemented.
Figure 3:
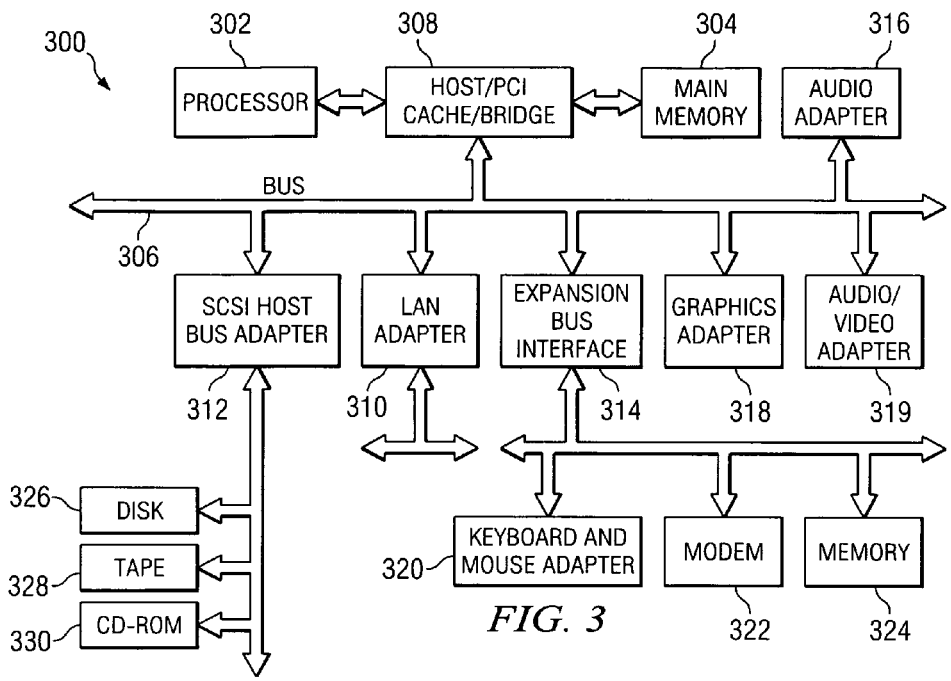
FIG. 3 is an exemplary block diagram of a client computing device in which aspects of the present invention may be implemented.

The present invention provides for a mechanism for aggregating data in a way that permits data to be deleted efficiently, while minimizing the overhead necessary to support bulk deletion of data. FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which code or instructions implementing the processes for embodiments of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, memory 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the buss system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

The present invention may be implemented in a distributed data processing environment or in a stand-alone computing system. For example, the present invention may be implemented in a server, such as server 104, or client computing device, such as clients 108-112. Moreover, aspects of the present invention may be implemented using storage device 106 in accordance with the present invention as described hereafter.

The configuration of the present invention is based upon a number of observations made of log-structured file systems. Therefore, a brief explanation of a log-structure file system will first be made. In its earliest incarnation, the log-structured file system was envisioned as a single contiguous log in which data was written at one end of a wrap-around log and free space was created at the other end by copying "live" files to the first end. This had the disadvantage that long-lived data would be continually garbage collected, resulting in high overhead. The problem of long-lived data was solved by segmenting the log into many fixed-size units, which were large enough to amortize the overhead of a disk seek relative to writing an entire unit contiguously. These units, called "segments," were cleaned in the background by copying live data from segments with low utilization (i.e., most of the segment already consists of deleted data) to new segments of entirely live data. See "The Design and Implementation of a Log-Structured File System," by Rosenblum and Ousterhout, ACM Transactions on Computer Systems, 1991, which is hereby incorporated by reference.

In an illustrative embodiment of the present invention, if sufficient space is available in an appropriate segment, an object is copied into the end of the segment; otherwise, the remaining space in the segment is marked as unused, the segment is marked as full, and a new unused segment becomes the target of the store. An object is a unit of data access. If an object exactly fills a segment, the segment is marked as full, and all space in the segment is marked as used. Unused space in a segment is known as fragmented storage. In the embodiment, an object larger than a single segment is stored as a special case of a single file that is created for the purpose of storing the object.

Each object has an associated creation time, initial retention value, and retention decay curve (also known as a retention curve). At any point, based on these values and the current time, the object's current retention value may be computed. The container system continually maintains a time-varying waterline: at any point, objects with a retention value below the waterline may be deleted.

In an illustrative embodiment of the present invention, objects with the same initial retention value and retention curve are placed in segments identified to hold such objects exclusively, with the segment being assigned a segment creation time equal to the creation time of the object most recently stored in it. Objects in a segment may thereby be evaluated and deleted en masse. Changing an object's retention curve therefore involves moving the object from one segment to another. Moving an object from a source to a destination segment could involve renaming the object, in turn requiring directories, if any, that identify the object's source to be updated to identify the object's destination, or alternative and/or additional means and/or methods to be applied. Simply removing the object from the source could increase fragmentation, as the space formerly occupied by the object may not be readily reusable until the segment as a whole is re-usable, i.e., until all objects in the segment have been deleted.

The present invention realizes a container as a single, potentially large file. Modern file systems support files logically reaching sizes of up to $2^{64}$ bytes. Even at the very substantial write rate of $2^{30}$ bytes per second, it would take upwards of 500 years to fill a single container of $2^{64}$ bytes. Presumably, file systems supporting yet larger file sizes, e.g., $2^{128}$ bytes, will be available before file size becomes a limiting factor.

A container file comprises an ordered list of file blocks, each of a fixed size, starting at offset zero, aligned on block boundaries. Without loss of generality we assume hereinafter that file blocks are 4,096 bytes in length. This is in contrast to a file system storage allocation unit which may be considerably larger, e.g., 1 Mbyte.

A file block is a logical entity; at any point it may be mapped by being associated with an identically-sized disk block, or it may remain unmapped. It is a function of a file system to transparently maintain the mapping. We assume further, again without loss of generality that a modern file system returns as logical zeroes, data retrieved from an unmapped file block.

In an illustrative embodiment of the present invention, an object is stored in a container file, starting and ending on a file block boundary. Objects are allocated an integral number of file blocks. If nothing but zero-length objects were stored in a container, one file block would be used per object, and fragmentation would be relatively high. Objects typically are larger, often substantially so. Typically, only a small amount of space allocated to objects is fragmented. The actual amount of file block fragmentation is dependent upon the distribution of object sizes and the file block size and cannot in general be estimated a priori.

Objects in a container abut each other, i.e., the only gaps between objects are those needed to bring an object to a file-block boundary. Objects may be of practically unlimited size, up to the maximum size of the container.

Turning to FIG. 4, an object header layout is depicted in accordance with an illustrative embodiment of the present invention. Each object starts with an object header 400. Object header 400 comprises object header magic number 402, object length 404, certain object flags 406, object creation time 408, object retention curve 410, container generation 412, hash vector 414, epochal object offset 416, a sync-point object offset 418. Object header 400 also comprises a reserved area 420.

Object header magic number 402 appears in a valid object header. Object header magic number 402 is a means for the container system to check for certain types of errors. Object length 404 indicates the actual amount of data associated with the object, not including padding to bring the allocated space up to a multiple of file blocks in length. The number of blocks allocated to the object may be computed directly from this number.

Object flags 406 indicate various things about the object. The meanings of various flags are described where and as necessary. Container generation 412 will be described further with respect to object tokens. Hash vector 414 is the hash initialization vector used for tokens generated for the container. The use of hash vector 414 will be described further with respect to retrieving an object from a container. Object creation time 408 corresponds to the time that the object was created. Some convention must be followed when assigning time values. Object retention curve 410 is an identifier for a mathematical function. Given one of the current time, the object creation time, the initial retention value, and/or the object retention curve, the retention value of the present object may be computed.

Epochal object offset 416 refers to the last object in a previous epoch. Epochal object offset 416 will be described further with respect to epochs and their establishment. Sync-point object offset 418 refers to an object recently known by the container system to have been sync-pointed. An object has been sync-pointed if and only if every disk block associated with the object and every previously created object, has been written to disk.

Figure 5:
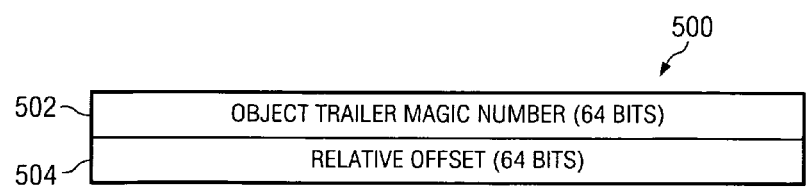
FIG. 5 depicts an object trailer layout in accordance with an illustrative embodiment of the present invention.

FIG. 5 depicts an object trailer layout in accordance with an illustrative embodiment of the present invention. Each object ends with an object trailer 500. Object trailer 500 comprises object trailer magic number 502 and relative offset 504. Object trailer magic number 502 appears in a valid object trailer. Object trailer magic number 502 is a means for the container system to check for certain types of errors. Relative offset 504 may be used to determine the start of the object. Relative offset 504 is the offset in bytes from the start of object trailer 500 to the start of object header 400 of FIG. 4 describing the object with which the file block is associated. For a single-block object, the field contains the value −4088LL. The field also may be used to determine whether the file block was completely (i.e., atomically) written to disk.

Figure 6:
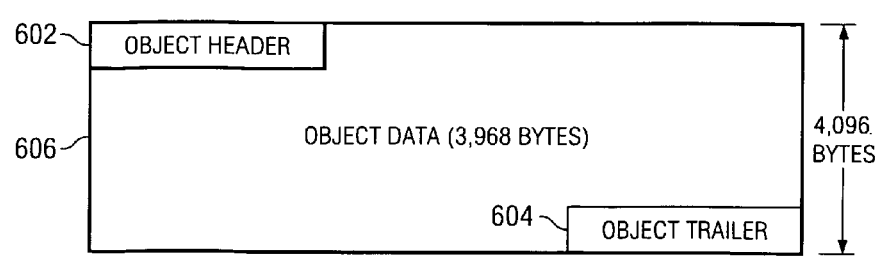
FIG. 6 depicts an exemplary single-block object layout in accordance with an illustrative embodiment of the present invention.

Thus, a single-block object may have a layout such as that depicted in FIG. 6 in accordance with an illustrative embodiment of the present invention. In single-block object layout 600, object header 602 is at the beginning of a single-block object and object trailer 604 is at the end. Object header 602 and object trailer 604 are separated by object data 606.

Objects may be larger than a single block. These are stored in multiple adjacent blocks and may comprise, in addition to object headers and object trailers, block headers and block trailers. Other than the first block, every block includes a block header, residing at the beginning of the block. Other than the last block, every block includes a block trailer, residing at the end of the block. The block header and trailer serve two purposes. First, they indicate whether the block was completely (i.e., atomically) written to disk. Second, they identify the object with which the block is associated, and its relative offset within the object.

FIG. 7 depicts a block header in accordance with an illustrative embodiment of the present invention. Block header 700 comprises block header magic number 702 and relative offset 704. Block header magic number 702 appears in a valid block header. Block header magic number 702 is a means for the container system to check for certain types of errors. Relative offset 704 may be used to determine the start of the object. Relative offset 704 is the offset in bytes from the start of the block header to the start of the object header describing the object with which the file block is associated. The field also may be used to determine whether the file block was completely (i.e., atomically) written to. For the second block in a multi-block object, the relative offset is −4096LL.

FIG. 8 depicts a block trailer in accordance with an illustrative embodiment of the present invention. Block trailer 800 comprises block trailer magic number 802 and relative offset 804. Block trailer magic number 802 appears in a valid block trailer. Block trailer magic number 802 is a means for the container system to check for certain types of errors. Relative offset 804 may be used to determine the start of the object. Relative offset 804 is the offset in bytes from the start of the block trailer to the start of the object header describing the object with which the file block is associated. The field also may be used to determine whether the file block was completely (i.e., atomically) written to. For the second block in a multi-block object, the relative offset is −8184LL.

Thus, a multi-block object may have a layout such as that depicted in FIG. 9 in accordance with an illustrative embodiment of the present invention. In multi-block object layout 900, object A header 902 is at the beginning of a multi-block object and object A trailer 904 is at the end. In between object A header 902 and object A trailer 904 are three data blocks: object A/1 data block 906, object A/2 data block 908, and object A/3 data block 910. Each data block has a header and a trailer; however, in the case of a multi-block object, an in-between header is considered a block header such as block A/2 header 912 and block A/3 header 914. Additionally, an in-between trailer is considered a block trailer such as block A/1 trailer 916 and block A/2 trailer 918.

Objects are appended to a container in the same order as they are created. As objects are appended, the container's file blocks are modified. The file system may lazily write modified file blocks to one or more disks in an order convenient to the file system. Disk blocks are not necessarily written to disk in the same order as their associated file blocks appear in the file or were modified. That is, the disk block corresponding to the $i^{th}$ file block may be written after the disk block corresponding to the $j^{th}$ file block, where $i<j$.

Herein, it is assumed that a file block will be completely (i.e., atomically) written to disk or not at all; a file block cannot be partly written. It is further assumed that a file block that has been allocated but has not had its underlying disk block written, when read back, will comprise logical zeroes. Modern file systems generally can provide these features.

Figure 10:
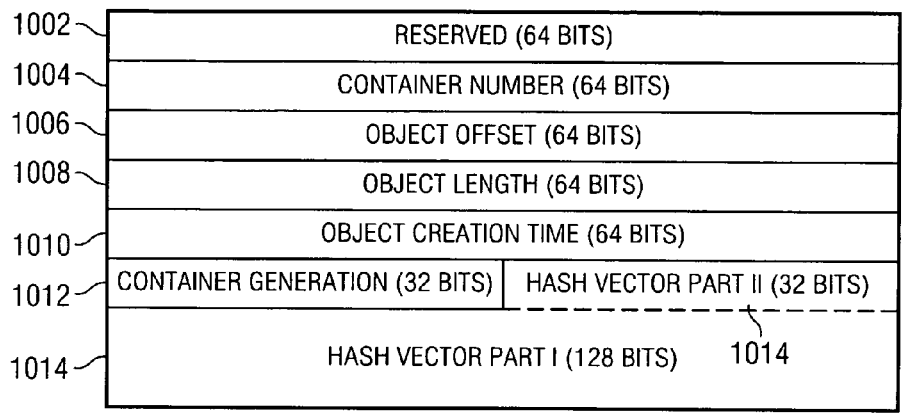
FIG. 10 depicts an exemplary data structure in accordance with an illustrative embodiment of the present invention.

Once an object has been stored in a container, it subsequently may be retrieved via an object token, as depicted FIG. 10 in accordance with an illustrative embodiment of the present invention. Token 1000 comprises container number 1004, object offset 1006, object length 1008, object creation time 1010, container generation 1012, and hash value 1014. Token 1000 also comprises a reserved area 1002.

Container number 1004 indicates the container with which token 1000 is associated. Object offset 1006 indicates the offset of the object within the container. Object length 1008 indicates the actual amount of data associated with the object, not including padding to bring the allocated space up to a multiple of file blocks in length. Object creation time 1010 indicates the time that the object was created. While this field has high resolution, its accuracy may be limited. Container generation 1012 is the reuse label associated with the container. Hash value 1014 is a secure hash of all of the preceding token fields, primed with a container hash initialization vector. Hash value 1014 guarantees that token 1000 cannot be modified by an application.

Object offset 1006 may be reused if a container identifier is reused. Container generation 1012 differentiates between reuses of a container identifier. When creating an object, its container generation 1012 is set to the generation of the container. Container generation 1012 may be incremented on reuse, may be a randomly-chosen number, or may be chosen via some other means and method. The algorithm and the value chosen are not depended upon.

Token hash value 1014 was chosen so as to be large enough for various well-known algorithms, including Secure Hash Algorithm-1 (SHA-1) and Message Digest #5 (MD5).

A closed container may be clean or dirty. A clean container is one that does not need to be recovered: its contents are internally consistent. It may have been closed before the most recent system failure; alternatively, it may have been open yet not have been modified for some time. A container is clean if its last object refers to the immediately preceding object as a sync-point object; otherwise, it is dirty.

In normal operation, a producer application puts an object into a container. Upon successful completion, the container system returns a token for the object. As previously described, the token contains various fields including identifiers for the container and object, the object's length, and its creation time. The container system supports objects with no minimum and no (practical) maximum size. Multiple producers may put objects into the same container "simultaneously." The container system adds them to the container according to a serializable schedule. Objects are time-stamped by creation time; however, an object's time stamp may not be entirely accurate. For this reason, objects placed in a container in a certain order may have time stamps in a different order. More precisely, an object with time stamp i may appear in the container after an object with time stamp j, where i<j. However, the container system limits the degree to which objects may appear "out of order," i.e., object i may appear after object j only if $i-j$<limit.

A producer may transmit a token via some mechanism beyond the scope of the present discussion, to one or more consumer applications. A consumer may retrieve the object from the container—if the object still is available and valid— by presenting the token to the container system. Objects need not be retrieved from a container in the same order that they were put into it. In fact, an object need not be retrieved at all. Multiple consumers may retrieve objects from the store simultaneously; indeed, the same object may be retrieved by multiple consumers simultaneously. As a token is not made available until an object has been put into a container, a consumer cannot retrieve an object that is not yet (fully) in the container.

If the present invention is implemented on a cluster of computers supporting a cluster file system, e.g., IBM's General Parallel File System (GPFS™), containers may be shared among producers and consumers running simultaneously on multiple computers in a single cluster.

In certain cases, it may be desirable for producers not to send tokens to consumers. The invention provides a means for a consumer, given a token for an object in a certain container, to retrieve the next object in the container. Complementing this means is a means to determine a container's first object. With these means, one or more producers may put a sequence of objects into a container, and a set of consumers may retrieve the objects, simply by sharing the identity of the container.

The invention manages storage in a manner similar to a delete-optimized store, at least at a high level. As previously described, each object is evaluated according to its retention curve, its initial retention value, its creation time, and the current time. See "Position: Short Object Lifetimes Require a Delete-Optimized Storage System," by Douglis et al., 11th ACM SIGOPS European Workshop, September 2004, which is hereby incorporated by reference. Its value is compared to a dynamically-computed waterline and, if below, the object is deleted. However, in other aspects, the method of the present invention differs substantially from that of the original proposal.

The invention supports immutable objects, i.e., objects that once created, are not changeable. There are several reasons for this choice. In one aspect, objects abut each other within a container. Extending an object in place could require moving one or more objects or storing an object in pieces. It would be problematic to move objects, as the object's token refers to the object's offset in its container. If the object were to move, a method to determine the object's "forwarding address" would need to be implemented.

One method to implement a forwarding address means and method would be to add the address to the original object, e.g., in an expanded header or within the old data body then apply it during the object retrieval process. However, since the old data body will likely have been deleted, a "tombstone" directing to a new location is not practical. Another approach would be to create a look-aside table that would be checked for a forwarding address for the object before retrieving the object. Checking a look-aside table prior to each object access could add potentially substantial overhead to the cost of an access. Of course, the look-aside table could be checked after failed object retrieval. The main issue then would be maintenance of the look-aside table without depending upon synchronization with the container system. Still another approach is to provide an automated means to convert an object's address into a new location, such as a specific file name. Automating the forwarding address via filename lookup is simple but has the disadvantage of adding overhead to each lookup of an object that has been deleted rather than relocated.

In another aspect of the present invention, an immutable object would have a fixed size, whereas a mutable object might not. For reasons of applications programmability and performance, the object length is included in its token.

Given an object's length, the application can allocate a buffer of sufficient size to hold the object prior to retrieving it. Not knowing the object's length beforehand, the application would have to guess, allocating a buffer of the hoped-for size. Alternatively, the application might allocate a buffer sufficiently large to hold a very large buffer. Upon attempting to retrieve an object too large for the buffer, the application would be told the object's actual length, would allocate a buffer sufficient to hold the object, and would try again to retrieve it. However, as the object is mutable, it might have grown in the interim. In the worst case, the application might have to try repeatedly to retrieve the object.

Along the same lines, knowing from the token the length of the object and its offset within the container file prior to retrieving it, the container system may schedule a disk read for the entire object at once. Were the length of the object not stored in the token, the container system first would have to retrieve it from the object header; thus, two disk reads would have to be scheduled and executed. In the first read, the object's header would be retrieved. The object's length would be extracted from the header then a second disk read, for the object's body, would be scheduled and executed. Although in the end the same disk blocks would be read, doing so as two reads versus one may inhibit performance, e.g., by increasing latency.

In the case where performance is inhibited, various optimizations may be applied. For example, the first disk read might be expanded to include not just the block containing the object header, but additional disk blocks, e.g., totaling eight or 16, on the assumption that "most" objects would be smaller than that and, therefore, a second read "typically" would prove unnecessary.

Applying read-ahead as an optimization eliminates the possibility of another very desirable one: reading the object's data blocks directly into the application's buffer. Without the latter optimization, the disk blocks typically would be read into a container system buffer then moved to the application's buffer. This move would add computation and memory bus overhead, as well as complicating the management of container system buffers.

Applying the read-ahead optimization yet reading the object's data into the application's buffer could introduce security problems. If the object were in fact smaller than the number of disk blocks read, data from a subsequent object could end up in the application's buffer. To eliminate this issue, the container system might subsequently have to overwrite in the application's buffer certain bytes written "inadvertently" (or, more properly, insecurely) therein. To do so might be problematic in certain cases, e.g., if the container system could be interrupted after the disk read but before the bytes had been overwritten.

In general, it is unclear whether object read-ahead would even be an effective optimization. In many cases there will be a large variance in the length of objects within and among containers. Different default read-ahead lengths might be appropriate for different cases. For a first container, it might be optimal to read ahead by four disk blocks, but by sixteen for a second. The read-ahead parameter could be set manually as an attribute of a container's attributes or it could be computed dynamically by the container system. Of course, read ahead would be unnecessary if an object's token were to include its length.

Suppose an existing mutable object were to comprise multiple disk blocks. A subsequent write to the object might fail for any of several reasons, including a full or partial system crash. A failed write may result in some blocks being written, but not others: An incomplete write would obtain.

In the simplest implementation of mutable objects, wherein objects lack on-disk trailers, it would be impossible to determine that any given write was incomplete. Worse, parts of one object might show up in another. Clearly, this would be undesirable as far as applications go. It might also have potential security implications.

A slightly more sophisticated implementation would incorporate object trailers including matching generations. The generations would be compared upon object retrieval: Non-matching generations would indicate an incomplete write. However, matching generations would not necessarily indicate a complete write. A write might complete to the header and trailer but not to all intermediate blocks. This case cannot be detected by object generations, headers, and trailers.

There may be a performance impact of using generations as well as object headers and trailers. However, unless the object, including its header and trailer, were read in a single operation, in general multiple I/Os would be required to determine whether the write completed, the header and trailer would be read separately. Depending on the size of the object, separating the two I/Os might prove time-intensive (i.e., slow).

In a more sophisticated implementation, object signatures could be used to determine whether a write completed. At write time, the (entire) object would be signed and stored in an object's trailer. The signature could be computed by hashing the full object or a portion of every block (on the assumption that block writes are atomic). To implement this technique would require that the object be scanned by the container system, both while being stored and retrieved. Potentially, to do so would have a substantial impact on performance: Object reads could otherwise be implemented without copying using direct I/O. For the container system to scan an object, each block of an object would have to be copied to a container system buffer, a portion of each block would have to flow through the computer's data cache, and a computation would have to be performed on the cached data. Of course, with the signing implementation, the same issue regarding reading the object in a single call vs. multiple calls would of course exist.

An aim of the present invention is to exploit the file system's features and functions, and to avoid wherever possible implementing similar function. In this section, we presume that the file system presents a modern interface based closely on the POSIX model.

When putting an object in a container, it is appended to the container file a single, append-mode write( ) operation. As POSIX guarantees that append-mode writes are atomic and serialized with respect to each other, application- and system-level locking are unnecessary with respect to object producers. Internally, of course, the file system must coordinate currency among competing, "simultaneous" appending programs.

When writing the object, a header and a trailer are constructed in the container system's memory. The header takes the format previously depicted in FIG. 4. The header magic number is set from a container system constant. The object flags are cleared. The object generation is the generation for the container into which the object is to be put. The object length is the number of bytes of data associated with the object. The object creation time is the present time of day. The object retention curve is either passed as a parameter by the producer application or is inferred from the container's attributes.

During normal operation, the container system maintains for each container an imprecise epochal object, an imprecise sync-point object, and a first object. Except for the first object, the offsets of these are copied into the corresponding object header fields. The object trailer takes the format depicted in FIG. 5. The trailer magic number is set from a container system constant. The object relative offset is computed with respect to the object header.

An iovec structure next is constructed pointing to these items as well as to the buffer identified by the application as containing the object's data. Then, the iovec structure is passed into an append-mode write( ). The header, data, and trailer are appended in order to the file, atomically and serially, in a single, sequential disk write( ).

Upon the successful completion of the write( ), the object token has been created. The container number is the identifier for the container into which the object is being stored. The object length, creation time, and generation are copied from the object header.

As append-mode write( ) was used, the object offset is only known a posteriori and must be determined. This is accomplished via a two-step computation. First, the file position is extracted from the FILE * data structure that the container system used to write( ) to the container file. The file position indicates the logical end of the file; it may differ from the actual file end as multiple producers may be placing objects into the same container (file) simultaneously. The FILE * structure contains a cached version of the file position as of the completion of the producer's most recent write( ). Second, the object length is subtracted from the file position. The result is the object offset.

Finally, the hash value is computed by applying a secure hash algorithm, primed with a container hash initialization vector, to the other token fields.

Once the token has been computed, it may be returned to the producer, which may in turn distribute the token freely. Possession of the token for an object is a requirement for the possessor to access the object, though access may be mitigated by additional security mechanisms.

If changed blocks of the container file were written to disk as soon as a producer put an object in the container, the container system typically would perform poorly. If the blocks might be written asynchronously, the producer might instead perform other work while the blocks were being written. On the other hand, if the blocks may be written asynchronously, the complexity of recovering after a system crash is increased. The system of the present invention incorporates a method of lazy synchronization. Several optimizations, some of which will be described below, may be incorporated to balance performance and recovery time/object loss in case of a system failure.

Objects are added to a container sequentially; we expect that the objects may not be retrieved from the container for some time and even then, it is possible that only a small percentage of the objects added will be retrieved. Given these expectations, we expect further that a container appears to be a sequentially written file that is later accessed either sequentially in full or randomly in only a small part.

It is possible that a container will appear as a sequentially written, sequentially read file where the producers and consumers typically operate within a few objects of each other. However, in many environments, especially those involving clustered systems, such an arrangement might tend to perform poorly, as the producers and consumers might tend to compete for the same resources, and conflict for the same file system locks.

Modern file systems tend to detect and specially handle files being written sequentially. That is, they typically attempt to avoid "polluting" the cache of disk blocks being used for other purposes, with blocks that are being accessed only sequentially. Generally, disk blocks associated with files being written sequentially are scheduled for writing to disk as soon as possible after they have been modified by an application. File systems typically make very little, if any, effort to keep "dirty" (modified but unwritten) blocks of such files in cache. Some file systems are notably more aggressive than others in this regard; nevertheless, it is an important and widely-adopted optimization.

Many operating systems in addition periodically schedule long-lived, dirty blocks for writing to disk. For example, UNIX™ and similar operating systems periodically exercise a sync( ) routine that schedules for writing all dirty disk blocks. Often, such operating systems more and more aggressively handle dirty disk blocks that remain in the disk cache even after multiple sync( ) cycles.

In many and perhaps the vast majority of cases, the sequential file "trickling" to disk and periodic sync( ) calls will be sufficient for the degree of synchronization required to implement containers efficiently and with reasonable semantics. However, other steps may be taken, to "harden" the semantics. For example, the container system itself might periodically initiate a sync( ) call, to encourage dirty blocks to be written to disk in a timely manner. Another technique is to request asynchronous "call-backs" when disk blocks have been written to disk. For this and other reasons, as will be obvious to one skilled in the art, asynchronous I/O is a generally useful technique to apply to container implementation. Various means and methods for implementing asynchronous I/O and interfaces for the same are well known in the art and, as such, are not described herein. Yet another strategy is to write all changes to the container file synchronously. While the slowest in terms of performance, it may be the most desirable option in some circumstances.

In the present invention, a container file is written sequentially. The underlying file system must allocate space to sequential files in an intelligent manner. Virtually all modern file systems handle space allocation to sequentially-written files very efficiently. A common technique, when the file initially is small, is to start by allocating a relatively small amount of storage to the file. Then, as the file system detects that the file is being written sequentially, larger and larger amounts of storage are allocated at a time, up to a certain maximum size. When the file is eventually closed, allocated but unused storage is freed.

Retrieving an object from a container is a much simpler matter than putting one in it. The container system is passed a token and a location of a buffer into which the object's data is to be copied. The token identifies the container, the object (by its offset within the container), and its length. The container system presumes that the calling application allocated a buffer large enough to hold the object's data. If not, the consequences are up to the application and operating system.

An application retrieving an object from a container does not lock the container. The container system relies on the file system to lock its data structures to the extent necessary. Retrieving the object works as follows.

The token's container number and generation are extracted. If the container number is in use and generation number extracted from the token matches that of the container, the container's hash initialization vector is located. A secure hash is computed for the token starting with the container's hash initialization vector. If the hash value computed matches that of the token, the token is valid. Next, the container file is opened, and an iovec structure is built, according to which the object's header, data, and trailers will be read. Its header and trailer will be copied into container system buffers and its data will be copied into an application buffer. The amount of data to be read is known by the application and the container system from the token's object length field.

Reading the header, data, and trailer are carried out via a single read( ) operation; however, a number of iovec structure entries may be required to read the data associated with an object. Object (resp., block) headers and trailers are stored in each file block. These must be skipped over when reading. As the starting offset of an object is known, the location of each object offset can be computed and placed in the iovec prior to the read( ) operation. The object offsets actually encountered during the read( ) may be stored into an array by the read( ) operation, and subsequently checked to ensure that each block intended to be retrieved was in fact valid. Alternatively, if a validity check is not needed, the object offsets may be read into a "dummy" buffer then deleted.

Multiple objects may be retrieved from the same container by different applications without blocking and, indeed, without concurrency control beyond that provided by the file system.

In some cases it may be desirable to retrieve the first object in a container. At all times, the offset of a container's first object is computable. As objects are deleted from a container, either programmatically or automatically, the container's first object changes. At points, the computation though just completed may be found in the next step to be invalid. In that case, the computation must be redone. The method of the present invention is forgiving of a stale computation of the first object.

Given a token, the next object in the container can be identified. There are two cases: either the current object exists or it doesn't. An object that no longer exists would have been deleted due to aging. (There is no means to explicitly delete an object.) It is simple to test whether an object exists or not. An object exists if and only if its offset is the same as or larger than that of the container's first object. If the current object exists, the next object is determined by computing from the current object the offset of the next object. The header of the next object is read. A token may be constructed for the next object, the object data may be returned, or both. If the current object does not exist, the first object is chosen as the next object.

As an important optimization, the container system may read ahead by one block whenever retrieving the next object from a container. The additional cost to read one additional block typically will be negligible, yet the value will be high: The additional block will contain the header of the next object in the container. From the header, the next object's token may be constructed and returned to the application. The application then will be able to retrieve the corresponding object—having first allocated a buffer to hold it—and the yet-next object's token in, a single disk read operation. Thus, retrieving a sequence of objects from a container can be highly efficient if done by container identifier rather than by a stream of tokens.

In addition to supporting uninterpreted data in the object body, the present invention also may support extended attributes, i.e., information about the data. The information can be of virtually any form, the specification of which is outside the scope of the present discussion. In general, the amount of extended attribute information data associated with an object tends to be much smaller than the object body. In some preferred embodiments, it may be stored entirely in the first block of the object. There are certain advantages to relegating the extended attribute data to this location. In one aspect, its location is precisely known as is the location of the object body, so the two could be retrieved independently if so desired. In another, it may be the case that extended attribute data must be updatable.

Though it has previously been indicated that mutable objects are undesirable, limiting changes to object to the first block, which not only is atomically-updatable but also contains the object header, presents certain key advantages. First, the attributes can be changed atomically, i.e., completely or not at all. Second, if the block containing the header somehow becomes corrupted, the object becomes irretrievable and the validity test is an easy one to perform.

In one preferred embodiment, to implement extended attributes being stored in a known location of an object, a multiple of file blocks would be allocated to hold the extended attributes. One of the reserved fields of the object header would be allocated to hold the extended attribute length, which would be the length in bytes of the extended attributes. Extended attributed length would the actual amount of extended attributes data associated with the object, not including padding to bring the allocated space up to a multiple of file blocks (typically, one) in length. The object length field of the object header would be renamed the object body length field. The number of blocks allocated to the object may be computed directly from the combination of extended attribute length and object body length.

In many cases, it is desirable for a system that stores data to maintain secure access to the data. The container system of the present invention can be augmented to do so, as follows. First, the means and method disclosed in the present invention assumes that the application, in association with the operating system, provides adequate information to the container system to identify the entities of interest. Second, the invention assumes that the container system may store with each object, sufficient information for a security system, with the application's identification information, to determine the access allowed to the application. Third, the invention assumes that a function is able, when passed the application's identification information and information stored with the object, to determine the access. The container system stores the object-specific security information in extended attributes that are not directly accessible to applications.

When an application passes a token into the container system, either it or the operating system also passes in identification information regarding the application. The container system retrieves the object's extended attributes and extracts from them the security-specific information. The container system then passes to the security checking function the application's identification information, the object-specific security information, and the type of access desired by the application. (With respect to the container system, the access desired would be to retrieve the object.) The security system would either allow or disallow the access, and the container system would act appropriately.

Unfortunately, if direct I/O is desired, the method would in general require two disk reads to securely retrieve the object. The first read would retrieve the object's extended attributes, and the second would retrieve its data. As performance might be substantially impacted by breaking the read in two, a method to reduce the impact is desirable.

In one preferred embodiment, the method of next object header read-ahead may be extended when reading the next object, to not only compute the token for the next object, but to cache the security-related extended attributes for the next object as well. Thus, when the next object is accessed, the next object's security information is available without having to perform two disk reads.

Unfortunately, the optimization does not in general provide any benefit for objects accessed entirely at random, as the security information for the next object will not typically be cached. In this case, it would seem that sequential scanning of objects in a container, by getting the first and then the next objects in succession, could well substantially outperform accessing individual objects by token, perhaps by a factor of two.

It is, however, possible that object retrieval patterns will not be entirely random; that is, they may follow a cyclical pattern wherein an object is selected more or less at random, then a series of sequential object retrievals is performed. In that case, the optimization would provide substantial benefit. As the run-time overhead would be negligible—an extra block read and a cache of one block between successive object retrievals, the value of the optimization may in many cases exceed its cost.

Yet a further valuable optimization may be to cache several of the most recent object headers that have been accessed, to handle the case where objects may be accessed out of order but with some locality.

The optimization of the previous section, i.e., caching the security information associated with the next object when reading a given object, may be extended to caching extended attributes in general. In that case, scanning through a container for objects with extended attributes matching certain criteria may be effected. If the objects to be scanned are relatively small compared to the cost ratio of sequential disk I/O to random disk I/O, and/or a large percentage of the objects scanned are retrieved, maximum performance may be achieved via this optimization than by reading only the extended attributes.

Objects may be deleted en masse in one of three ways. Deleting the container in which an object resides causes the object to be deleted. Short of deleting the container, objects may be deleted programmatically, i.e., under application control, by their creation date. Alternatively, objects may be deleted automatically, i.e., as a result of value-based storage management.

Within a container, objects older than an application-supplied time-stamp may be deleted en masse. Logically, the list of objects comprising the container is scanned from its tail forward for objects older than the time-stamp. If one is found, it is deleted and the next one is examined. The process will end when either an object is found with a time-stamp newer than that supplied by the application, or the end of the container is reached.

In practice, it would be inefficient to implement programmatic object deletion as logically described. In the first place, the container might contain an enormous number of objects, so scanning through them would be impractical. In the second place, deleting the objects one at a time would make storage management inefficient on most modern file systems. The present invention includes means and methods for implementing the process efficiently.

If epochs (and epochal objects) are chosen well, the number of epochs will be substantially smaller than the number of objects and/or the number of blocks comprising a container. In that case, scanning through an epoch list may be substantially faster than scanning through the container. In normal operation, if the list is reasonably small, a version of it may be cached in memory for an in-use container. In some cases, it may be possible to cache key information about epochal objects, especially their creation times, for efficient scanning of an epochal object list.

To identify objects to be programmatically deleted, an epochal object list may be scanned backward, from the head (more recent end) of the container toward the tail (less recent end), until an object is found that is older than the date supplied. Then, the list of objects within that epoch may be scanned forward, until an object with a creation date newer than the supplied date is found. All prior objects then are deleted. Note that variations on this theme may be employed. For example, in some preferred embodiments, the method steps of scanning within the last epoch may be skipped, so that entire epochs, rather than individual objects, are deleted. Note that in all cases, an epoch begins and ends on an object boundary.

Objects that have been identified for deletion are deleted en masse. Modern file systems typically provide a means for destroying the mapping between file blocks and disk blocks. For example, IBM's journaling file system for the AIX™ operating system provides an fclear( ) system call that logically zeroes a byte range of a file. Where possible, the call unmaps file blocks; otherwise, the blocks are zeroed. GPFS implements fclear( ) for clusters based on AIX™ on IBM® pSeries™ computers. File systems supporting the X/Open™ Data Storage Management facility provide the dm_punch_hole( ) function, which is similar to fclear( ). Where possible, disk blocks underlying a file region are unmapped.

By deleting objects en masse, optimizing epoch management, and relying on fclear( ), dm_punch_hole( ), or other file-to-disk unmapping facility, a modern file system is able to optimize storage allocation among containers without undue fragmentation.

In some cases, it may be desirable to delete individual objects in a container. In one preferred embodiment, an object may be deleted merely by setting the OBJECT_DELETED flag; however, there is a potential security issue associated with this embodiment. If the object is retrieved by token, the object body may be copied into the application's buffer before the object is known to have been deleted. In another preferred embodiment, the object to be deleted may be replaced by a null object; however, there is a security issue associated with this embodiment, as well, and the embodiment may be less efficient, even substantially so. In turning the existing object into a null object, the body of the object would be overwritten with ASCII NUL bytes. If the system were to fail while the object were only partially overwritten, or before all of the blocks of the fully-overwritten object had been written to disk, it should not be possible that data from non-overwritten blocks of the object would be copied into the application's buffer before the object is known to have been deleted. A full implementation of either embodiment would have to take these issues into account, for instance using write-ahead logging.

If the deletion of individual objects were supported, epoch fragmentation could become an issue. Suppose that a substantial fraction of the objects in an epoch have been deleted. In that case, it might be desirable to unmap the file blocks so that the theretofore associated disk blocks might be reused. Of course, storage allocation units would have to be taken into account when determining whether to unmap blocks, or file system fragmentation could occur. We assume without loss of generality that unmapping would occur on storage-unit aligned, storage-unit size sections of a container file. Thus, only if all of the objects in a storage unit had been deleted could the unit be unmapped.

Figure 11:
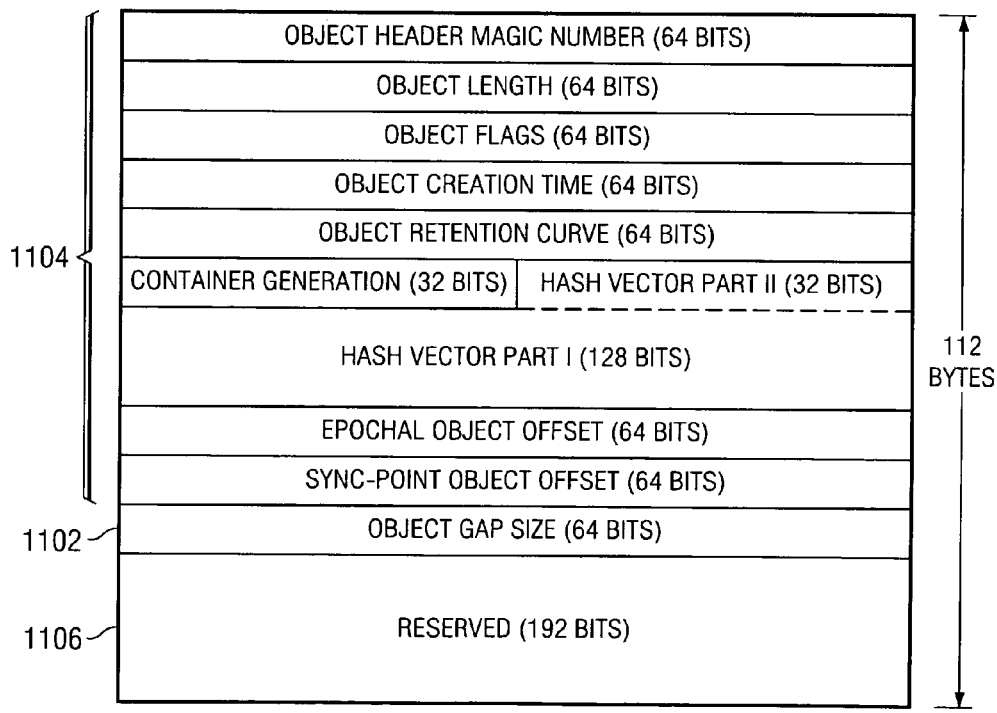
FIG. 11 depicts an object header layout for sparse epochs in accordance with an illustrative embodiment of the present invention.

FIG. 11 depicts an object header layout for sparse epochs in accordance with an illustrative embodiment of the present invention. In one preferred embodiment, a reserved field of the object header 1100, object gap 1102 would indicate the empty region (if any), in bytes, between one object and the next, and the container's epoch chain would be updated to reflect unmapped allocation units. Fields in section 1104 and reserved area 1106 were previously described in FIG. 4. However, reserved area 1106 changes in size when object gap 1102 is added to object header 1100.

Figure 12:
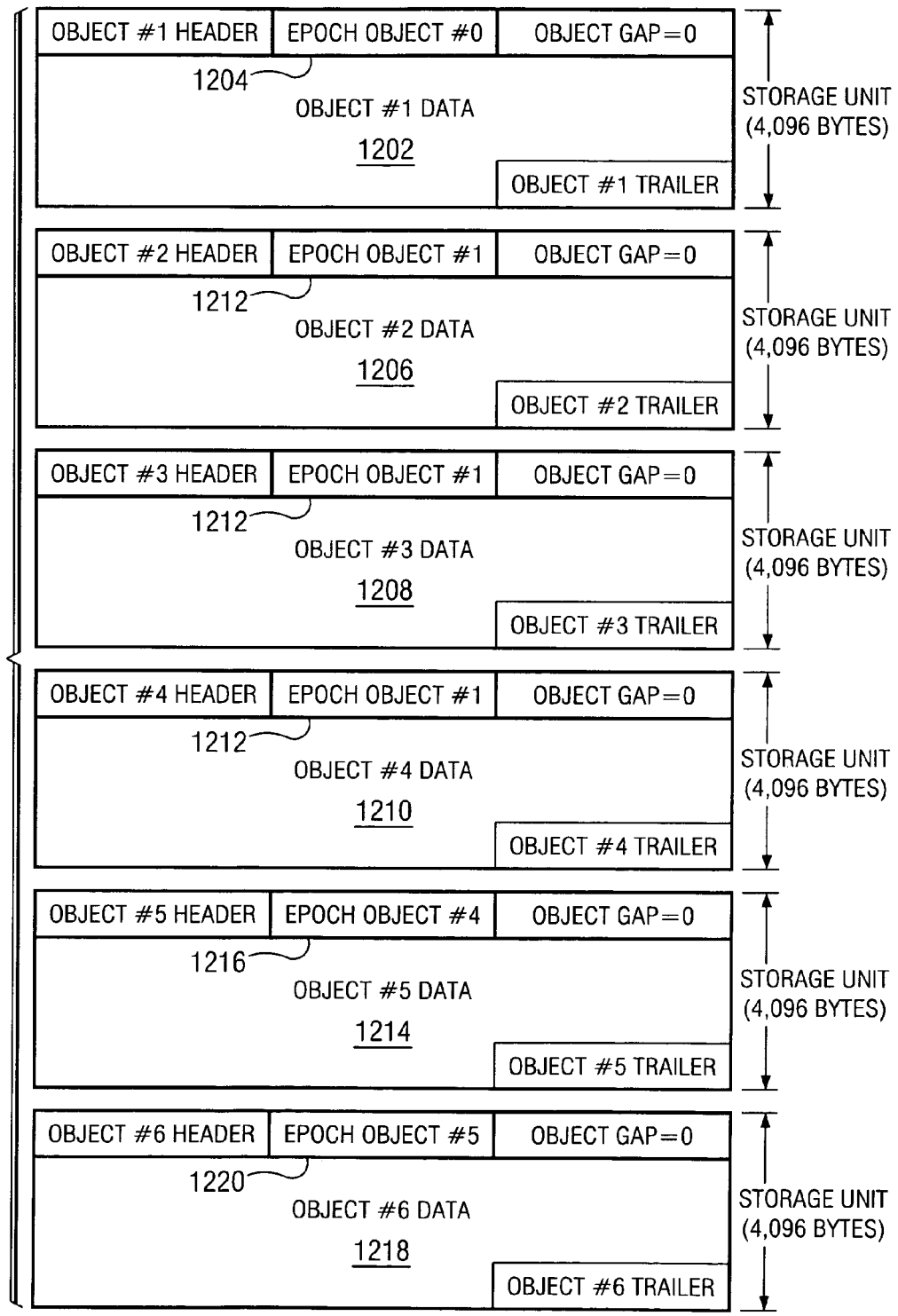
FIG. 12 depicts an epoch chain before storage unit deletion in accordance with an illustrative embodiment of the present invention.
Figure 13:
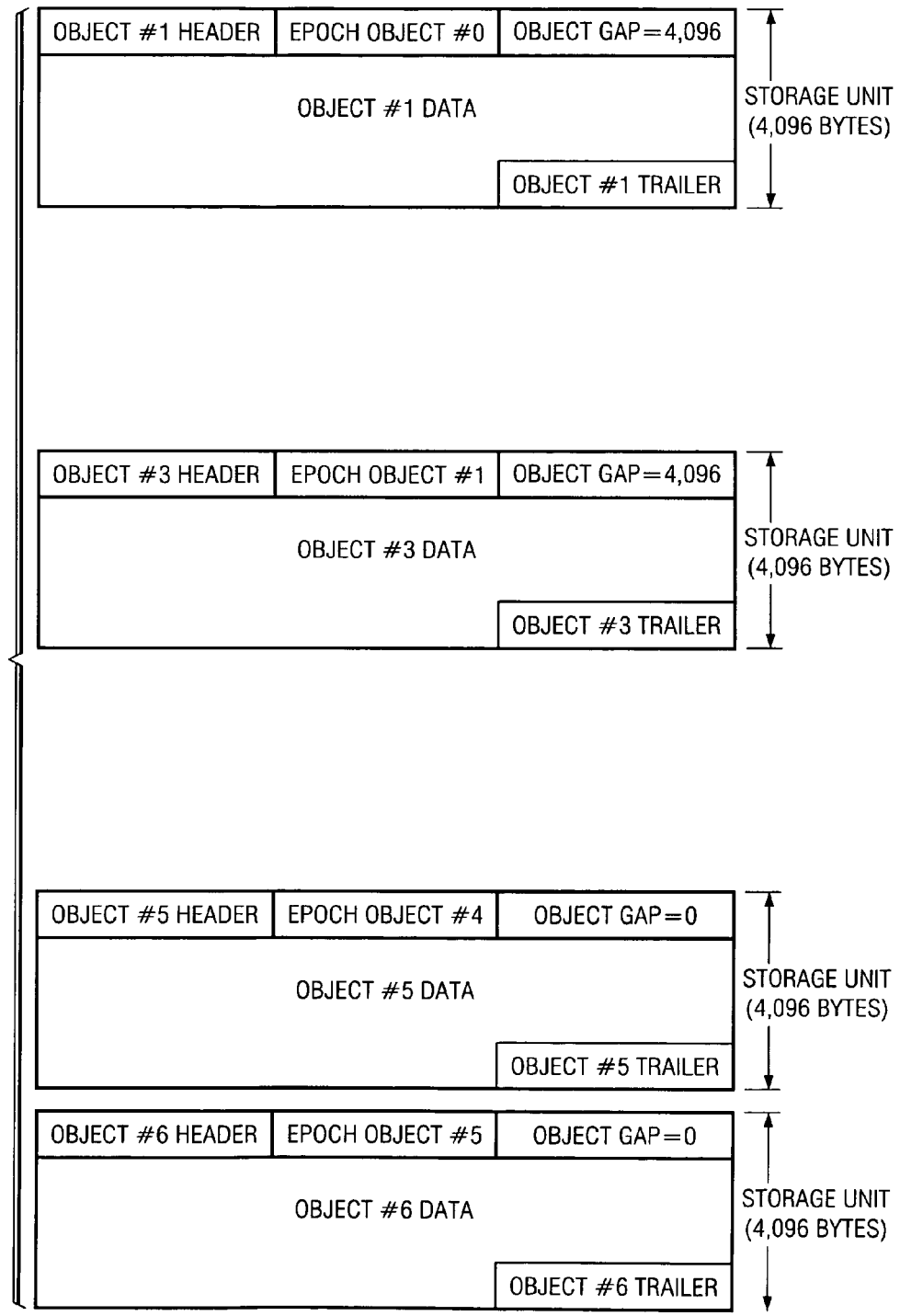
FIG. 13 depicts an epoch chain after storage unit deletion in accordance with an illustrative embodiment of the present invention.

FIGS. 12 and 13 depict an exemplary change in an epoch chain to accommodate the unmapping of a storage allocation unit in accordance with an illustrative embodiment of the present invention. FIG. 12 depicts an epoch chain before storage unit deletion in accordance with an illustrative embodiment of the present invention. FIG. 13 depicts an epoch chain after storage unit deletion in accordance with an illustrative embodiment of the present invention. For simplicity, the example from FIG. 12 to FIG. 13 depicts without loss of generality a case in which a storage allocation unit is exactly one block. Those skilled in the art will understand how to extend the example without undue experimentation to a functioning system. In FIG. 12, object 1202 comprises epoch object #0 1204, objects 1206, 1208, and 1210 comprise epoch object #1 1212, object 1214 comprises epoch object #4 1216, and object 1218 comprises epoch object #5 1220. FIG. 13 depicts the resulting storage allocation after objects 1206 and 1210 of FIG. 12 are deleted and the underlying storage allocation units unmapped.

Of course, the means and method of sparse epochs also may be used to support the modification of retention curves on a fine granularity basis, e.g., per-object, per set of objects, per-segment. If the retention curves of objects within an epoch differ, the epoch may be split and storage unmapped using the sparse epoch method. For example, an epoch may be split dynamically along storage allocation unit lines such that those objects in a first range of allocation units share a first retention curve, those in a second range share a second curve, and so forth. In one preferred embodiment, as the retention curves of objects are changed, epochs may be split and/or coalesced. In another preferred embodiment, epoch splitting and/or coalescing may be deferred until the container valet as scans through the epoch chain. In another preferred embodiment, changes to the retention value or curve of an object are accomplished by copying the object to a new container or a separate file in the underlying file system.

Automatic object deletion is somewhat simpler than programmatic deletion. Periodically, a container system waterline is set by some entity beyond the scope of the present discussion, said waterline indicating the minimum "value" of objects that must be maintained within containers. An object has a retention function and a creation time; along with the current time, these allow the object's value to be determined. An object with a value below the waterline may be deleted; otherwise, it must be maintained.

As with programmatic object deletion, objects within the earliest epoch may be scanned, or more simply, just the epoch chain may be scanned. If only the epoch chain is scanned, the value of an epoch may be considered to be the same as that of the newest object it contains. Note: Here, the discussion has assumed that the objects in a container, or at least the objects in an epoch, have the same retention curve. If this is not the case, storage management becomes substantially more complex.

An important optimization, that may improve performance in file systems employing unbalanced trees to map file blocks to disk blocks, may be to truncate the container file to zero length in the event that the container becomes empty. This would tend to eliminate indirect, double-indirect, triple-indirect, and so forth blocks from the tree and thereby improve block lookup performance. The optimization presumably would be less valuable in extent-based file systems. One issue with the optimization would be the maintenance of the container generation. In the case where the generation is based on a random number choice or time-stamp, the problem is inconsequential. If it is based on container-based state, a null object may be added to the container immediately after the container has been truncated.

In the present invention, automatic storage management works as follows. Each container has associated with it exactly one valet. Periodically, the valet opens the container, determines its length via fstat( ), and locates the object at that address. Note that objects may be added after that point by one or more producers. The valet need only locate an object near the tail of the file. As container blocks begin and end on well-known boundaries, the identification of the object is straightforward.

From the header of the located object, the valet extracts the epochal object offset field, which identifies the next epoch in the epoch chain. The valet then scans backwards through the epoch chain, recording the chain as it proceeds, until the first epoch is reached. The valet knows that the first epoch has been reached when the epochal object offset field of an object header in the epoch chain indicates an offset before the first live object in the file. Then, scanning forward through the recorded chain, the valet computes the value of some object in each epoch. The valet might choose the epochal object for this purpose.

As every object in an epoch has the same retention curve, the value of one object in an epoch is approximately the same as every other one. Next, comparing the computed value for the epoch with that of the waterline, the valet decides whether to retain or delete the epoch. If the epoch is to be deleted, the file blocks are unmapped and the associated storage is freed.

In the case where retention curves cannot be changed, i.e., all of the objects in a container have the same curve, which is set at the container's creation the valet may stop the then-current evaluation-deletion cycle once it detects an (y) epoch that should not be deleted. This line reasoning assumes that retention curves decrease monotonically with time. That is, suppose there is an epoch created a time t having the value x. Then every epoch (if any) created at any subsequent time t+e where e is positive, has a value y where y≥x.

In the case where retention curves can be changed, it is possible that a subsequently created epoch may have a value y<x, in which case the valet cannot necessarily stop once it detects an epoch that should not be deleted. There may be subsequent epochs that could be deleted.

The valet runs periodically whether the container is in active use or not; moreover, in a clustered system, the valet may run on any cluster node. Various additional optimizations may be applied in the scheduling of the valets, to minimize overhead. For example, the system could cache in memory the value of the least valuable epoch in each container, and then process the containers in increasing order of their least valuable data.

There are two cases to consider when determining whether automatic storage management might interact with other operations. One is whether it might interact with adding an object to a container; the other is whether it might interact with retrieving an object from a container.

With regard to putting an object into a container, again there are two cases to consider: the truncation case, in which the container is being truncated to zero length and the fclear( ) or dm_punch_hole( ) case, in which a single epoch—but not the last—is being freed from the container.

In the former case, at issue is whether an object may be added to the container "while" the container is being truncated. If ftruncate( ) were to be used, problems could ensue. If ftruncate( ) were called at the "same" time as append-mode write( ), which is used to put objects into a container, it is possible that the write( ) might be lost, which would be undesirable.

One solution would be to lock out writes and truncates. This solution would be undesirable as locks would have to be acquired and released frequently—in the worst case every time an object were added to a container.

A way to avoid lock contention is to limit the valet from using fclear( ) or dm_punch_hole( ) to delete the last epoch in a file. In this case, the operations do not conflict as they address different parts of the file.

Automatic storage management could interact with retrieving an object from a container. Punching a hole in a file via dm_punch_hole( ) or fclear( ) is not atomic with respect to read( ). Thus, an application may be retrieving an object while the epoch containing it is being unmapped. In that case, the application may receive ASCII NUL (i.e., zero) bytes rather than the expected results. One solution would involve locking the retrieval of objects with respect to automatic storage management. This solution would be undesirable as locks would have to be acquired and released frequently—in the worst case every time an object were retrieved from a container.

In FIG. 14, a flow diagram 1400 illustrating an exemplary operation of aggregating data in a way that permits data to be deleted efficiently in bulk in accordance with an illustrative embodiment of the present invention. As the operation begins a request is received for automatic deletion of segments in a container (step 1402). Then a determination of a waterline that is to be applied to the container is made (step 1404). The first segment in the container is then located (step 1406) and checked to determine if the segment falls below the waterline (step 1408). If the segment falls below the waterline (step 1410), it is deleted from the container (step 1412). Then a determination is made if there are more segments (step 1414). If there are more segments, then the next segment is located in the container (step 1416, and the operation continues with step 1408. If at step 1414, there are no more segments in the container to check, the operation ends. Returning to step 1410, if the segment that is being checked does not fall below the waterline, the operation proceeds to step 1414 and continues as previously described.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

A method is presented for bulk deletion through segmented files comprising receiving a request for automatic deletion of segments in a container; determining a waterline for the container; determining if at least one segment within a plurality of segments in the container falls below the waterline; and in response to the at least one segment falling below the waterline, deleting the at least one segment from the container. In one illustrative embodiment, the waterline is set to a segment retention value, and the segment retention value is a function of information within the given segment and is a minimum value to retain the given segment. In one illustrative embodiment the minimum value is determined by at least one of the creation date of the given segment, the retention decay curve of the given segment, the initial retention value of the given segment, the current time or a date for deletion of the given segment. In one illustrative embodiment the waterline is a value determined by a function, the function is determined by a retention decay curve of a given segment, and determining if the at least one segment within the plurality of segments in the container falls below the waterline further comprises identifying the at least one segment within the plurality of segments in the container whose value is below the waterline to form an identified segment; and deleting the identified segment from the container. In one illustrative embodiment, segments that are not identified for deletion are not contiguous. In one illustrative embodiment, segments that are not identified for deletion are contiguous. In one illustrative embodiment, the waterline is a value determined by a function that converts a creation date of a given segment to the value and determining if the at least one segment within the plurality of segments in the container falls below the waterline further comprises: scanning the plurality of segments in the container from a beginning of the container in ascending date order for the least one segment whose value is above the waterline; and deleting the at least one segment from the beginning of the container up to the segment whose value is above the waterline. In one illustrative embodiment, deleting the at least one segment from the container is performed by unmapping individual file blocks associated with the at least one segment.

A data processing system is presented comprising: a bus system; a communications system connected to the bus system; a memory connected to the bus system, wherein the memory includes a set of instructions; and a processing unit connected to the bus system, wherein the processing unit executes the set of instructions to receive a request for automatic deletion of segments in a container; determine a waterline for the container; determine if at least one segment within a plurality of segments in the container falls below the waterline; and delete the at least one segment from the container in response to the at least one segment falling below the waterline. In one illustrative embodiment, the waterline is set to a segment retention value, wherein the segment retention value is a function of information within the given segment and is a minimum value to retain the given segment. In one illustrative embodiment, the minimum value is determined by at least one of the creation date of the given segment, the retention decay curve of the given segment, the initial retention value of the given segment, the current time or a date for deletion of the given segment. In one illustrative embodiment, the waterline is a value determined by a function, the function is determined by a retention decay curve of a given segment, and the set of instructions to determine if the at least one segment within the plurality of segments in the container falls below the waterline further comprises: a set of instructions to identify the at least one segment within the plurality of segments in the container whose value is below the waterline to form an identified segment; and delete the identified segment from the container. In one illustrative embodiment segments that are not identified for deletion are not contiguous. In one illustrative embodiment, segments that are not identified for deletion are contiguous. In one illustrative embodiment, the waterline is a value determined by a function that converts a creation date of a given segment to the value and the set of instructions to determine if the at least one segment within the plurality of segments in the container falls below the waterline further comprises: a set of instructions to scan the plurality of segments in the container from a beginning of the container in ascending date order for the least one segment whose value is above the waterline; and delete the at least one segment from the beginning of the container up to the segment whose value is above the waterline. In one illustrative embodiment the set of instructions to delete the at least one segment from the container is performed by a set of instructions to unmap individual file blocks associated with the at least one segment.

A computer program product is presented comprising: a computer usable medium including computer usable program code for bulk deletion through segmented files, the computer program product including computer usable program code for receiving a request for automatic deletion of segments in a container; computer usable program code for determining a waterline for the container; computer usable program code for determining if at least one segment within a plurality of segments in the container falls below the waterline; and computer usable program code for deleting the at least one segment from the container in response to the at least one segment falling below the waterline. In one illustrative embodiment, the waterline is set to a segment retention value, wherein the segment retention value is a function of information within the given segment and is a minimum value to retain the given segment. In one illustrative embodiment, the minimum value is determined by at least one of the creation date of the given segment, the retention decay curve of the given segment, the initial retention value of the given segment, the current time or a date for deletion of the given segment. In one illustrative embodiment, the waterline is a value determined by a function, wherein the function is determined by a retention decay curve of a given segment, and the computer usable program code for determining if the at least one segment within the plurality of segments in the container falls below the waterline further comprises: computer usable program code for identifying the at least one segment within the plurality of segments in the container whose value is below the waterline to form an identified segment; and computer usable program code for deleting the identified segment from the container. In one illustrative embodiment, segments that are not identified for deletion are not contiguous. In one illustrative embodiment, segments that are not identified for deletion are contiguous. In one illustrative embodiment the waterline is a value determined by a function that converts a creation date of a given segment to the value and wherein the computer usable program code for determining if the at least one segment within the plurality of segments in the container falls below the waterline further comprises: computer usable program code for scanning the plurality of segments in the container from a beginning of the container in ascending date order for the least one segment whose value is above the waterline; and computer usable program code for deleting the at least one segment from the beginning of the container up to the segment whose value is above the waterline. In one illustrative embodiment, deleting the at least one segment from the container is performed by unmapping individual file blocks associated with the at least one segment.

What is claimed is:

1. A method for bulk deletion through segmented files, the method comprising:
    receiving a request for automatic deletion of segments in a container, wherein the container is exactly one file;
    determining a waterline for the container, wherein the waterline is a value, and wherein the value is based on a first retention decay curve of a given segment, and wherein the first retention decay curve is a decreasing mathematical function of the value over time, and wherein the value is a minimum value to retain a segment within a plurality of segments in the container;
    determining if at least one segment value within a plurality of segment values in the container falls below the waterline; and
    in response to the at least one segment value falling below the waterline, automatically deleting at least one segment associated with the at least one segment value from the container, wherein:
    the value is selected from a first range of numbers between and including a first real number and a second real number;
    the at least one segment value within the plurality of segment values is selected from a second range of numbers between and including a third real number and a fourth real number;
    the first real number is a lowest number of the first range of numbers;
    the second real number is a highest number of the first range of numbers;
    the third real number is a lowest number of the second range of numbers;
    the fourth real number is a highest number of the second range of numbers;
    the first real number, the second real number, the third real number, and the fourth real number are real numbers other than dates;
    the first real number and the second real number included in the range of numbers are on the first retention decay curve;

the third real number and the fourth real number included in the second range of numbers are on a second retention decay curve;

the second range of numbers is selected from the group consisting of the first range of numbers and another range of numbers different from the first range of numbers; and the second retention decay curve is selected from the group consisting of the first retention decay curve and another retention decay curve different from the first retention decay curve.

2. The method of claim 1, wherein:
the value is set to a segment retention value;
the segment retention value is a function of information within the given segment; and
the segment retention value is the minimum value to retain the given segment within the plurality of segments in the container.

3. The method of claim 2, wherein the minimum value is determined by at least one of a creation date of the given segment, an initial retention value of the given segment, a current time, or a date for deletion of the given segment.

4. The method of claim 1, wherein the value is determined by the decreasing mathematical function, and wherein the decreasing mathematical function is determined by the first retention decay curve of the given segment, and wherein determining if the at least one segment value within the plurality of segment values in the container falls below the waterline further comprises:

identifying at least one segment within the plurality of segments in the container whose value is below the waterline to form an at least one identified segment; and deleting the at least one identified segment from the container.

5. The method of claim 4, wherein segments that are not identified for deletion are not contiguous.

6. The method of claim 4, wherein segments that are not identified for deletion are contiguous.

7. The method of claim 1, wherein the value is determined by a function that converts a creation date of the given segment to the value and wherein determining if the at least one segment within the plurality of segments in the container falls below the waterline further comprises:

scanning the plurality of segments in the container from a beginning of the container in ascending date order for a segment whose value is above the waterline; and deleting the segments from the beginning of the container up to the segment whose value is above the waterline.

8. A data processing system comprising:
a bus system;
a communications system connected to the bus system;
a memory connected to the bus system, wherein the memory includes a set of instructions; and
a processing unit connected to the bus system, wherein the processing unit executes the set of instructions to receive a request for automatic deletion of segments in a container, wherein the container is exactly one file; determine a waterline for the container, wherein the waterline is a value, and wherein the value is based on a first retention decay curve of a given segment, and wherein the first retention decay curve is a decreasing mathematical function of the value over time, and wherein the value is a minimum value to retain a segment within a plurality of segments in the container; determine if at least one segment value within a plurality of segment values in the container falls below the waterline; and automatically delete at least one segment associated with the at least one segment value from the container in response to the at least one segment value falling below the waterline, wherein:

the value is selected from a first range of numbers between and including a first real number and a second real number;

the at least one segment value within the plurality of segment values is selected from a second range of numbers between and including a third real number and a fourth real number;

the first real number is a lowest number of the first range of numbers;

the second real number is a highest number of the first range of numbers;

the third real number is a lowest number of the second range of numbers;

the fourth real number is a highest number of the second range of numbers;

the first real number, the second real number, the third real number, and the fourth real number are real numbers other than dates;

the first real number and the second real number included in the range of numbers are on the first retention decay curve;

the third real number and the fourth real number included in the second range of numbers are on a second retention decay curve;

the second range of numbers is selected from the group consisting of the first range of numbers and another range of numbers different from the first range of numbers; and the second retention decay curve is selected from the group consisting of the first retention decay curve and another retention decay curve different from the first retention decay curve.

9. The data processing system of claim 8, wherein:
the value is set to a segment retention value;
the segment retention value is a function of information within the given segment; and
the segment retention value is the minimum value to retain the given segment within the plurality of segments in the container.

10. The data processing system of claim 9, wherein the minimum value is determined by at least one of a creation date of the given segment, an initial retention value of the given segment, a current time, or a date for deletion of the given segment.

11. The data processing system of claim 8, wherein the value is determined by the decreasing mathematical function, and wherein the decreasing mathematical function is determined by the first retention decay curve of the given segment, and wherein the set of instructions to determine if the at least one segment within the plurality of segments in the container falls below the waterline further comprises:

a set of instructions to identify at least one segment within the plurality of segments in the container whose value is below the waterline to form at least one identified segment; and delete the at least one identified segment from the container.

12. The data processing system of claim 11, wherein segments that are not identified for deletion are not contiguous.

13. The data processing system of claim 11, wherein segments that are not identified for deletion are contiguous.

14. The data processing system of claim 8, wherein the value is determined by a function that converts a creation date of the given segment to the value and wherein the set of instructions to determine if the at least one segment within the plurality of segments in the container falls below the waterline further comprises:
  a set of instructions to scan the plurality of segments in the container from a beginning of the container in ascending date order for a segment whose value is above the waterline; and delete segments from the beginning of the container up to the segment whose value is above the waterline.

15. A computer program product comprising:
  a non-transitory computer readable medium including computer usable program code for bulk deletion through segmented files, the computer usable program code including:
  computer usable program code for receiving a request for automatic deletion of segments in a container, wherein the container is exactly one file;
  computer usable program code for determining a waterline for the container, wherein the waterline is a value, and wherein the value is based on a first retention decay curve of a given segment, and wherein the first retention decay curve is a decreasing mathematical function of the value over time, and wherein the value is a minimum value to retain a segment within a plurality of segments in the container;
  computer usable program code for determining if at least one segment value within a plurality of segment values in the container falls below the waterline; and
  computer usable program code for automatically deleting at least one segment associated with the at least one segment value from the container in response to the at least one segment value falling below the waterline, wherein:
  the value is selected from a first range of numbers between and including a first real number and a second real number;
  the at least one segment value within the plurality of segment values is selected from a second range of numbers between and including a third real number and a fourth real number;
  the first real number is a lowest number of the first range of numbers;
  the second real number is a highest number of the first range of numbers;
  the third real number is a lowest number of the second range of numbers;
  the fourth real number is a highest number of the second range of numbers;
  the first real number, the second real number, the third real number, and the fourth real number are real numbers other than dates;
  the first real number and the second real number included in the range of numbers are on the first retention decay curve;
  the third real number and the fourth real number included in the second range of numbers are on a second retention decay curve;
  the second range of numbers is selected from the group consisting of the first range of numbers and another range of numbers different from the first range of numbers; and
  the second retention decay curve is selected from the group consisting of the first retention decay curve and another retention decay curve different from the first retention decay curve.

16. The computer program product of claim 15, wherein:
  the value is set to a segment retention value;
  the segment retention value is a function of information within the given segment; and
  the segment retention value is the minimum value to retain the given segment within the plurality of segments in the container.

17. The computer program product of claim 16, wherein the minimum value is determined by at least one of a creation date of the given segment, an initial retention value of the given segment, a current time, or a date for deletion of the given segment.

18. The computer program product of claim 15, wherein the value is determined by the decreasing mathematical function, and wherein the decreasing mathematical function is determined by the first retention decay curve of the given segment, and wherein the computer usable program code for determining if the at least one segment within the plurality of segments in the container falls below the waterline further comprises:
  computer usable program code for identifying at least one segment within the plurality of segments in the container whose value is below the waterline to form at least one identified segment; and
  computer usable program code for deleting the at least one identified segment from the container.

19. The computer program product of claim 18, wherein segments that are not identified for deletion are not contiguous.

20. The computer program product of claim 18, wherein segments that are not identified for deletion are contiguous.

21. The computer program product of claim 15, wherein the value is determined by a function that converts a creation date of the given segment to the value and wherein the computer usable program code for determining if the at least one segment within the plurality of segments in the container falls below the waterline further comprises:
  computer usable program code for scanning the plurality of segments in the container from a beginning of the container in ascending date order for a segment whose value is above the waterline; and
  computer usable program code for deleting segments from the beginning of the container up to the segment whose value is above the waterline.

* * * * *